United States Patent Office
3,351,653
Patented Nov. 7, 1967

3,351,653
FLUORINE-CONTAINING HYDROXY ACIDS AND ESTERS AND METHODS FOR THE MANUFACTURE THEREOF
Russell L. K. Carr, Grand Island, and Charles F. Baranauckas, Niagara Falls, N.Y., assignors to Hooker Chemical Corporation, Niagara Falls, N.Y., a corporation of New York
No Drawing. Filed Mar. 8, 1962, Ser. No. 178,228
12 Claims. (Cl. 260—484)

This invention relates to new compositions of matter and their methods of preparation. More specifically, the inventive concept herein resides in novel fluorinated hydroxy acids.

The novel composition of this invention may be illustrated by the following general formula:

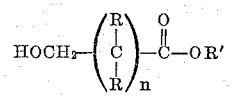

wherein $n$ is a number from two to three inclusive, and R is a substance selected from the group consisting of hydrogen, fluorine, perfluoroalkyl, perfluorocycloalkyl, perfluoroaryl, alkyl, cycloalkyl, aryl, and mixtures thereof and wherein at least one of the R's contains fluorine, and R' is a substance selected from the group consisting of hydrogen, alkyl, aryl, and cycloalkyl.

Typical compositions included within the above general formula are:

5-hydroxy-2,2-difluorovaleric acid,
5-hydroxy-3,3-difluorovaleric acid,
5-hydroxy-4,4-difluorovaleric acid,
5-hydroxy-2,2,3,3-tetrafluorovaleric acid,
5-hydroxy-2,2,4,4-tertafluorovaleric acid,
5-hydroxy-2,2,3,4-tetrafluorovaleric acid,
5-hydroxy-3,3,4,4-tetrafluorovaleric acid,
5-hydroxy-2,3,3,4,4-pentafluorovaleric acid,
5-hydroxy-2,2,3,4,4-pentafluorovaleric acid,
5-hydroxy-2,2,3,3,4-pentafluorovaleric acid,
5-hydroxy-2-trifluoromethyl valeric acid,
5-hydroxy-2-pentafluoroethyl valeric acid,
5-hydroxy-2-heptafluoropropylvaleric acid,
5-hydroxy-2-nonafluorobutyl valeric acid,
5-hydroxy-3-trifluoromethyl valeric acid,
5-hydroxy-3-pentafluoroethyl valeric acid,
5-hydroxy-3-heptafluoropropyl valeric acid,
5-hydroxy-3-perfluoroundecylvaleric acid,
5-hydroxy-3-perfluorocyclobutyl valeric acid,
5-hydroxy-3-perfluorocyclopentylvaleric acid,
5-hydroxy-3-perfluorocyclohexyl valeric acid,
5-hydroxy-3-perfluorophenyl valeric acid,
5-hydroxy-3-trifluoromethyl-2,2,3,4,4-pentafluorovaleric acid,
5-hydroxy-3-trifluoromethyl-2,2,4,4-tetrafluorovaleric acid,
5-hydroxy-3-trifluoromethyl-2,2,3-trifluoro valeric acid,
5-hydroxy-3-trifluoromethyl-2,2-difluoro valeric acid,
5-hydroxy-3-trifluoromethyl-4,4-difluoro valeric acid,
5-hydroxy-4-trifluoromethyl-2,2,3,3,4-pentafluorovaleric acid,
5-hydroxy-4-trifluoromethyl-2,2,3,3-tetrafluorovaleric acid,
5-hydroxy-4-trifluoromethyl-2,3-difluorovaleric acid,
5-hydroxy-4-trifluoromethyl-3,3-difluorovaleric acid,
5-hydroxy-4-pentafluoroethyl-3,3-difluorovaleric acid,
5-hydroxy-4-pentafluoroethyl-2,2,3,3-tetrafluorovaleric acid,
5-hydroxy-3,3-bis(trifluoromethyl)valeric acid,
5-hydroxy-3,3-bis(trifluoromethyl)-2,2,4,4-tetrafluorovaleric acid,
5-hydroxy-3,3-bis(trifluoromethyl)-2,2-difluorovaleric acid,
5-hydroxy-3,3-bis(trifluoromethyl)-4,4-difluorovaleric acid,
5-hydroxy-3,3-bis(trifluoromethyl)-2,2,4-trifluorovaleric acid,
5-hydroxy-3,3-dimethyl-2,2,4,4-tetrafluorovaleric acid,
5-hydroxy-3,3-dimethyl-2,2-difluorovaleric acid,
5-hydroxy-3,3-dimethyl-4,4-difluorovaleric acid,
5-hydroxy-3,3-dimethyl-2,2,4-trifluorovaleric acid,
5-hydroxy-3,3-dimethyl-2,4-trifluorovaleric acid,
5-hydroxy-2,3-dimethyl-2,3,4-trifluorovaleric acid,
5-hydroxy-3-methyl-3-ethyl-2,2,4,4-tetrafluorovaleric acid,
5-hydroxy-3,3-diethyl-2,2,4,4-tetrafluorovaleric acid,
4-hydroxy-2,2-difluoro butyric acid,
4-hydroxy-3,3-difluorobutyric acid,
4-hydroxy-2,2,3,3-tetrafluorobutyric acid,
4-hydroxy-2,2,3-trifluorobutyric acid,
4-hydroxy-2,3,3-trifluorobutyric acid,
4-hydroxy-2,3-difluorobutyric acid,
4-hydroxy-2-trifluoromethylbutyric acid,
4-hydroxy-2-pentafluoroethylbutyric acid,
4-hydroxy-2-heptafluoro propyl butyric acid,
4-hydroxy-2-nonafluorobutyl-butyric acid,
4-hydroxy-3-trifluoromethyl butyric acid,
4-hydroxy-3-pentafluoroethyl butyric acid,
4-hydroxy-3-heptafluoro propyl butyric acid,
4-hydroxy-3-perfluoroundecyl butyric acid,
4-hydroxy-3-perfluorocyclobutyl butyric acid,
4-hydroxy-3-perfluorocyclopentyl butyric acid,
4-hydroxy-3-perfluorocyclohexyl butyric acid,
4-hydroxy-3-perfluoro phenyl butyric acid,
4-hydroxy-3-trifluoromethyl-2,2,3-trifluoro butyric acid,
4-hydroxy-3-trifluoromethyl-2,2-difluorobutyric acid,
4-hydroxy-3-trifluoromethyl-3-fluorobutyric acid,
4-hydroxy-3-trifluoromethyl-2-fluoro butyric acid,
4-hydroxy-3-ethyl-2,2-difluoro butyric acid,
4-hydroxy-3-methyl-2,2-difluorobutyric acid,
4-hydroxy-3-phenyl-2,2-difluorobutyric acid,
4-hydroxy-2-phenyl-3,3-difluoro butyric acid,
4-hydroxy-3,3-bis(trifluoromethyl)butyric acid,
4-hydroxy-3-trifluoromethyl-3-heptafluoropropyl-2,2-difluoro butyric acid,
4-hydroxy-2,2-bis(pentafluoroethyl)butyric acid,
4-hydroxy-2,3-bis(pentafluoroethyl)-2,3-difluorobutyric acid,
4-hydroxy-3,3-dimethyl-2,2-difluoro butyric acid,
4-hydroxy-2,2-diethyl-3,3-difluoro butyric acid,
4-hydroxy-2-methyl-2-trifluoromethyl-3,3-difluoro butyric acid,
4-hydroxy-2-trifluoromethyl-3-pentafluoroethyl butyric acid.

The compositions of this invention are useful as herbicides, surface active agents, and as intermediates in the production of various polymers.

The compositions of this invention may be prepared via three distinct routes as illustrated by the below general equations:

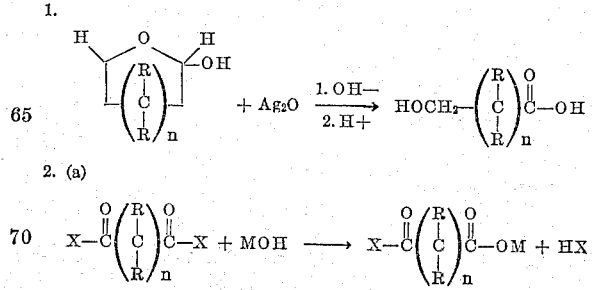

(b)

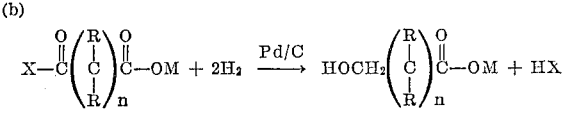

(c)

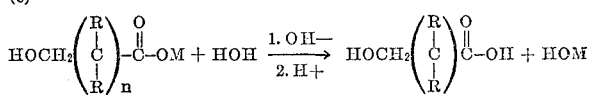

3.

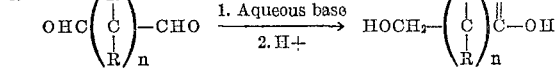

In the above method equations and in subsequnent equations of this disclosure (used to make the composition of this invention), the numbers above and below the arrows refer to successive processing steps, $n$ is a number from two to three inclusive; R is a substance selected from the group consisting of hydrogen, fluorine, perfluoroalkyl, perfluorocycloalkyl, perfluoroaryl, alkyl, cycloalkyl, aryl, and mixtures thereof, and wherein at least one of the R's contain fluorine; X is a substance selected from the group consisting of chlorine, fluorine, bromine, and mixtures thereof, M is a substance selected from the group consisting of alkyl, cycloalkyl, aryl and mixtures thereof. Specific and typical starting materials and reactants of the above general methods to produce a typical composition of this invention are as follows:

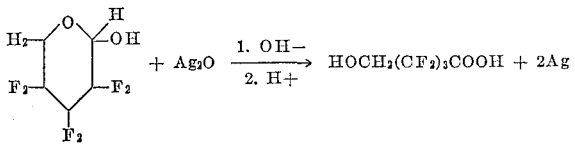

The above hemi-acetal, 2-hydroxy-3,3,4,4,5,5-hexafluorotetrahydropyran, was oxidized with an aqueous-basic solution of silver oxide; upon subsequent acidification, a new composition of this invention $HOCH_2(CF_2)_3COOH$, 2-hydroxy-3,3,4,4,5,5-hexafluorovaleric acid was formed.

2. (a)

(b)

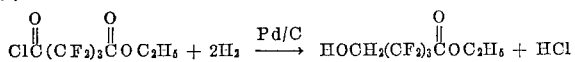

(c)

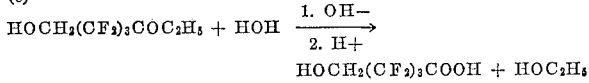

To an equivalent of the above

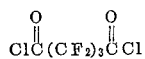

was added an equivalent of ethanol to form

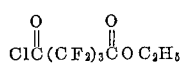

This resulting product was passed over a Pd on carbon catalyst with an excess of hydrogen to give a second product

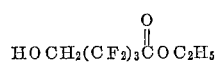

This second product upon hydrolysis under alkaline conditions followed by acidification gave a new composition of this invention, $HOCH_2(CF_2)_3COOH$, 5-hydroxy-2,2,3,3,4,4-hexafluorovaleric acid.

3.

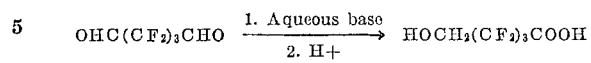

The above dialdehyde (which is a new composition of matter disclosed and claimed in a copending application, S.N. 178,259, filed Mar. 8, 1962, can be prepared by hydrogenating hexafluoroglutaryl chloride at near atmospheric pressures over a one percent palladium-on-carbon catalyst as discussed more fully in the copending application), is caused to undergo an internal Cannizzaro reaction and upon contact with an aqueous base followed by acidification, forms a new composition of this invention.

As is well known in the hydrocarbon chemistry of $\gamma$- and $\delta$-hydroxy acids, the possibility exists that lactone formation may occur. With the $\gamma$-hydroxy hydrocarbon acids the five-membered lactone ring is formed so easily that difficulty is often encountered in the isolation of the free acid from acidic solutions (Fieser, L. F., and Fieser, M., Advanced Organic Chemistry, Reinhold, 1961). However, the ease of preparation of esters from fluorinated acids and fluorinated alcohols is not necessarily strictly comparable to the preparation of esters from non-fluorinated acids and alcohols. (For instance, see Lovelace, A. M., Postelnek, W. and Rausch, D. A., Aliphatic Fluorine Compounds, ACS Monograph No. 138, Reinhold, 1958.) For these reasons, although the new compositions of matter of this invention are called hydroxy acids, either by name or by formula, it should be understood that the mixture arising from the acid being present in admixture with their lactone are included within the scope of this invention.

It is apparent from the present disclosure that various salts and esters of the carboxylic acid portion of the hydroxy acids of this invention also representing new compositions of matter can be prepared. In addition, it would be a simple matter for one skilled in the art to prepare other compounds from the aforementioned hydroxy acids such as ethers, amides, hydrazides, esters and salts (of the hydroxyl portion of the hydroxy acid), and more highly halogenated derivatives, all of which would be new compositions of matter.

All of the above stated methods will be further illustrated and the specifics of same will be set out in the ensuing disclosure.

It is therefore an object of this invention to provide new compositions of matter.

A further object is to provide methods for the preparation of these new compositions of matter.

A still further object is to provide methods for the preparation of compositions of this invention in comparatively high yields.

Other objects will become apparent to those skilled in the art upon a further reading of this disclosure.

The following examples will illustrate further the particulars of this invention. These examples will be given for purposes of illustration and are not meant to be limiting to the specifics set out.

*Example 1*

To a solution of silver nitrate (sixty-three grams, 0.37 mole), in water (one hundred and five milliliters), was added a solution of sodium hydroxide (twenty-eight grams, 0.70 mole) in water (one hundred and five milliliters), with stirring. The brown solid silver oxide was removed by filtration, washed with water (two hundred milliliters), and transferred to a beaker. After covering the oxide with a solution of sodium hydroxide (fourteen grams, 0.35 mole), in water (three hundred milliliters), and warming to forty degrees centigrade, 2-hydroxy-3,3,4,4,5,5-hexafluorotetrahydropyran (discussed in a copending application, forty grams, 0.175 mole), was added with heating and stirring during a period of about one-half hour. At the end of this time the brown solid had disappeared (the temperature was eighty degrees centigrade), a mirror had formed on the beaker walls and a fluffy grey precipitate of silver had formed.

The warm mixture was filtered, the silver was washed with water and all filtrates were combined and acidified. After extracting with ten seventy-five milliliter portions of diethyl ether the extracts were combined, dried over molecular sieves and distilled. After removal of the ether there was obtained twenty-nine grams, boiling point fifty to fifty-seven degrees at thirty millimeters, $n^{21}$ 1.3625, $d^{20}$ about 1.71. The material was acidic and had an infrared spectrum characteristic of carboxylic acids. The method of preparation is consistent with the material being $HOCH_2(CF_2)_3COOH$ existing as such or in equilibrium with its lactone,

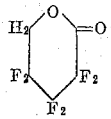

Example 2

Silver oxide was prepared from silver nitrate (one hundred and twenty-eight grams, 0.75 mole), and sodium hydroxide (eighty-eight grams, 2.3 moles), in water in the manner of Example 1 and was used to oxidize 2-hydroxy-3,3,4,4,5,5 - hexafluorotetrahydropyran (eighty grams, 0.35 mole), in the manner of Example 1. Rectification of the ether extract led to the isolation of eighteen grams, boiling point one hundred and forty-one to one hundred and forty-three degrees centigrade, $n^{24}$ 1.3641 and twenty-seven grams, boiling up to sixty-seven degrees at thirty millimeters, $n^{24}$ 1.3622. Infrared spectra of both these materials showed them to be substantially the hydroxyacid of Example 1.

Example 3

To hexafluoroglutaryl chloride (eight hundred and thirty grams, three moles), containing in a one-liter, round bottomed flask equipped with an addition funnel, stirrer, condenser leading to a trap cooled in a Dry-Ice-acetone bath, and thermometer, was added ethanol (anhydrous 2B, sixty-nine grams, 1.5 moles) with stirring at such a rate that the temperature did not exceed fifty degrees centigrade. At the end of the addition the mixture was heated to one hundred degrees centigrade and allowed to cool. Fractionation yielded two hundred and twelve grams, boiling point 161.5 to 163.5 degrees centigrade, $n^{21}$ 1.3571 and twenty-seven grams, boiling point 163.5 to one hundred and sixty-six degrees centigrade. A sample was collected, boiling at 162.5 degrees centigrade, the infrared spectrum of this filed as a reference standards is consistent with the structure

Hydrogenation of the ester-acid chloride was effected in a system comprised essentially of a glass tubing reactor seven-eighths of an inch by one inch in diameter and about seventeen inches long having an electrically heated section about twelve inches long and equipped with a system for the addition of hydrogen gas and the acid chloride. The reactor system was also equipped with a pressure relief valve (for purposes of safety), a thermocouple well and a thermocouple connected to a potentiometer, and a receiver connected to the exit end of the reactor which was also connected to a trap cooled in a Dry-Ice-acetone cooling bath. The heated section of the reactor was filled with a one percent palladium on carbon catalyst.

The aforesaid material, boiling point 161.5 to 163.5 degrees centigrade, $n^{21}$ 1.3571 (two hundred grams), and hydrogen gas (flow rate about 3.6 moles per hour), were passed through the reactor system just described during a period of about 4.2 hours. The temperature near the middle of the reactor varied in the range of two hundred and one to two hundred and twenty-two degrees centigrade. Hydrogen was passed through the hot reactor for an additional one-half hour and then while the reactor cooled to room temperature. The weight of all products removed totaled one hundred and forty grams. Distillation led to the isolation of about sixty-five grams, boiling point sixty to one hundred and ten degrees centigrade at about one millimeter pressure, having a refractive index of 1.3600–1.3602 at twenty degrees centigrade.

The hydrogenated material (thirty-two grams, boiling point eighty to one hundred and ten degrees centigrade, $n^{20}$ 1.3600), was covered with water (one hundred milliliters) in a beaker, and aqueous sodium hydroxide (ten grams in about one hundred milliliters water) was added slowly dropwise until substantially all the organic phase had disappeared and the slightly basic solution was extracted with three fifty milliliter portions of diethyl ether. The aqueous solution was then strongly acidified with hydrochloric acid and extracted with six sixty to seventy milliliter portions of diethyl ether. The ether portions were combined, dried over Drierite and distilled. About twenty grams of syrupy material was obtained, boiling point forty to seventy degrees centigrade at ten to fifty millimeters pressure. An infrared spectrum of this material proved it to be substantially the hydroxy acid of Example 1.

Example 4

The dialdehyde polymer $(CHO(CF_2)_3CHO)_x$, 3.5 grams (discussed more fully in a copending application) was heated at reflux for fifteen minutes with approximately two molar aqueous sodium carbonate. At the end of the heating period a one phase light yellow solution was obtained. Tests on the aqueous system with cerous nitrate and with silver nitrate gave no precipitates for fluoride ion or chloride ion respectively. The mixture was then extracted three times with diethyl ether and acidified; this acid solution was extracted four times with ether, the extracts were combined, dried over drierite, filtered and distillate removed to a vapor temperature of one hundred and twenty degrees centigrade. The infrared spectrum of the residue showed it to be substantially the hydroxyacid of Example 1.

Example 5

Hexafluoroglutaryl chloride (four hundred and thirty-seven grams, 1.58 moles, flow rate about 0.38 mole per hour), and hydrogen (flow rate about 4.1 moles per hour), were reacted over a one percent palladium on carbon catalyst in a system like the hydrogenation system described in Example 3 modified as follows: The receiver was replaced by another so designed that the product could be dropped at will into a stirred solution of sodium carbonate in water (one mole of carbonate per five hundred milliliters of $H_2O$). During the reaction of the present example the product was allowed to drop into the carbonate solution as collected. When reaction was complete, water was added to dissolve precipitated salts and the resulting one phase system was extracted with six seventy-five milliliter portions of diethyl ether. (Rectification of this "basic extract" as described in a copending application led to the recovery of 2-hydroxy-3,3,4,4,5,5-hexafluorotetrahydropyran in about sixty-four percent yield.) The aqueous solution remaining from the preceding extraction was acidified strongly with hydrochloric acid and this solution was then extracted with six seventy-five milliliter portions of diethyl ether which were then combined and distilled to give about fourteen grams of material with infrared spectra indicating that it was substantially the hydroxyacid of Example 1.

Example 6

Hexafluoroglutaryl chloride (four hundred and fifty-one grams, 1.63 moles, 0.26 mole per hour), and hydrogen (4.1 moles per hour) were reacted in the manner of Example 5 in a similar system except that the reactor was heated by a solvent boiling at one hundred and sixty-two degrees centigrade which was refluxed through a jacket surrounding the reactor. The temperature within the reactor reached two hundred and seventy-five degrees centigrade during the reaction. The hydroxyacid of Example 1 was obtained in ten to fifteen percent yield together with 2-hydroxy-3,3,4,4,5,5-hexafluorotetrahydropyran (discussed in a copending application), in about sixty-five percent yield.

Example 7

The apparatus used in this example was comprised essentially of a distillation apparatus having a heated receiver containing a thermometer. This receiver was connected to an electrically heated tubular glass reactor containing five percent palladium on carbon and connected to a receiver. Both this latter receiver and the condenser on the distillation apparatus were connected to a trap cooled in Dry Ice acetone. The system was so arranged that a slow flow of nitrogen could be passed through the system while in operation.

$(CHOCF_2CF_2CHO)_x$, twenty grams, was placed in the still pot of the distillation apparatus and heated to depolymerize it. The refluxing dialdehyde (boiling at 102.5 to one hundred and three degrees centigrade), was allowed to drip into the heated receiver from which it was vaporized into the column containing the palladium catalyst maintained at a temperature in the range one hundred and fifty to one hundred and eighty-one degrees centigrade. The material collected in the final receiver had an infrared spectrum which was similar to, though not identical with the hydroxyacid of Example 1.

Example 8

5-hydroxy-2,2,3,3,4,4-hexafluorovaleric acid was examined for herbicidal activity in preliminary greenhouse tests. Plots containing seedlings of rye, millet and cucumber were sprayed at the rate of four pounds per acre when the seedlings were two to three weeks old. The spray comprised the composition of this invention contained in water which in turn contained about 0.5 volume percent of a mixture of emulsifier, xylene and isophorone. The seedlings were examined about two weeks after the application; injury to the plants indicated phytotoxicity, thus suggesting utility in weed control.

Various changes and modifications may be made in the methods and compositions of this invention, certain preferred forms of which have been herein described, without departing from the spirit and scope of this invention. These modifications of this basic invention are to be regarded as within the scope and purview of this invention.

We claim:

1. A composition having the following general formula:

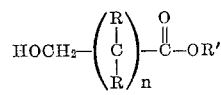

wherein $n$ is a number from two to three inclusive and R is selected from the group consisting of hydrogen, fluorine, perfluoroalkyl, perfluorocycloalkyl, perfluoroaryl, alkyl, cycloalkyl, aryl and mixtures thereof, wherein at least one of the R's contains fluorine, and wherein R' is a substance selected from the group consisting of hydrogen and alkyl.

2. The composition of claim 1 wherein $n$ is equal to two.

3. The composition of claim 1 wherein $n$ is equal to three.

4. The composition of claim 1 wherein at least one of the R's is fluorine.

5. The composition of claim 2 wherein R is fluorine.

6. The composition of claim 3 wherein R is fluorine.

7. The composition of claim 2 wherein at least one of the R's is fluorine.

8. The composition of claim 3 wherein at least one of the R's is fluorine.

9. A method for the preparation of the composition of claim 1 where R' is hydrogen which comprises contacting a one-half molar proportion of an alcohol with a molar proportion of a substance having the following general formula:

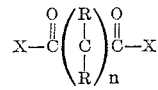

wherein X is a substance selected from the group consisting of chlorine, fluorine, bromine, and mixtures thereof, and wherein $n$ is a number from two to three inclusive; R is a substance selected from the group consisting of hydrogen, fluorine, perfluoroalkyl, perfluorocycloalkyl, perfluoroaryl, alkyl, cycloalkyl, aryl, and mixtures thereof, and wherein at least one of the R's contains fluorine to form the corresponding monoester; contacting the resulting monoester formed thereby with hydrogen in the presence of a palladium catalyst to form the corresponding hydroxy ester and hydrolyzing said hydroxy ester with an alkali hydroxide.

10. A method for the preparation of the composition of claim 1 wherein R' is hydrogen which comprises hydrolysis of a substance with an alkali hydroxide, followed by acidification, said substance having the following general formula:

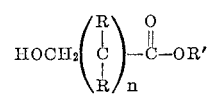

wherein $n$ is a number from two to three inclusive; R is a substance selected from the group consisting of hydrogen, fluorine, perfluoroalkyl, perfluorocycloalkyl, perfluoroaryl, alkyl, cycloalkyl, aryl and mixtures thereof, wherein at least one of the R's contains fluorine, and wherein R' is alkyl.

11. A method according to claim 9 in which the substance of the formula:

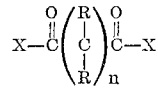

is hexafluoroglutaryl chloride.

12. A method according to claim 11 in which the alcohol is ethanol.

References Cited

UNITED STATES PATENTS

| | | | |
|---|---|---|---|
| 2,392,974 | 1/1946 | Clifford | 260—473 |
| 2,452,791 | 11/1948 | Raasch | 260—484 |
| 2,456,633 | 12/1948 | Haensel | 260—638 |
| 2,568,619 | 9/1951 | Gregory | 260—484 |
| 2,668,104 | 2/1954 | Eastman | 71—2.6 |
| 2,754,188 | 7/1956 | Yowell et al. | 71—2.6 |
| 2,996,525 | 8/1961 | Barnhart et al. | 260—633 |

OTHER REFERENCES

Wertheim, E.: "Organic Chemistry," QD 251 W48 (1959), pp. 217, 218, 235.

Lovelace et al.: "Aliphatic Fluorine Compounds" (1958), page 253.

RICHARD K. JACKSON, *Primary Examiner.*

LORRAINE A. WEINBERGER, *Examiner.*

S. B. WILLIAMS, A. D. ROLLINS, *Assistant Examiners.*